United States Patent Office 2,835,687
Patented May 20, 1958

2,835,687
ISOTOPE FRACTIONATION PROCESS

Glenford H. Clewett and De Wayne A. Lee, Oak Ridge, Tenn., and Ward B. Schaap, Bloomington, Ind., assignors to the United States of America as represented by the United States Atomic Energy Commission No Drawing. Application March 25, 1952
Serial No. 278,482

20 Claims. (Cl. 260—429.1)

The present invention relates in general to the fractionation and enrichment of uranium with respect to one or more particular isotopes thereof, and more particularly to a new and improved liquid-liquid extraction process for the purpose, particularly adapted to such fractionation and enrichment with respect to $U^{235}$ and $U^{238}$.

As is known, isotopic enrichment of uranium has become of great importance. Of particular interest is the separation of natural uranium, which comprises ca. 0.7% $U^{235}$ and ca. 99.3% $U^{238}$ into fractions richer in $U^{235}$, and other fractions richer in $U^{238}$—toward ultimate virtually complete isolation of each isotope by successive fractionation. Widely developed for this purpose have been various physical methods, including gaseous diffusion, electromagnetic separation, and thermal diffusion. While such physical methods have proven capable of effecting enrichment on a production scale, they are exceedingly complex and are beset with myriad technical difficulties. It has, therefore, been highly desirable that simpler and easier alternative effective means be found for the purpose.

In this direction, there has been continuing concurrent interest in chemical methods of isotopic fractionation. However, while in the past a number of chemical techniques have been devised for accomplishing isotopic enrichment, their effectiveness has, in the main, been limited to merely those elements having atomic weights not substantially above 40 to 60. As an outstanding exception to such limitation, though, there has recently been devised a chemical method for the fractionation of uranium isotopes, based upon a discovered isotopic preferentiality, in the spontaneous chemical exchange of dissolved uranium atoms between different positive oxidation states. That is, it was found that in an aqueous acidic solution of uranous and uranyl ions, isotopically comprising $U^{235}$ and $U^{238}$, a continuous, spontaneous chemical interposition of uranium atoms between the tetravalent and hexavalent oxidation states takes place, wherein $U^{235}$ concentrates slightly in the uranyl state, while $U^{238}$ oppositely concentrates slightly in the uranous state. In applying this discovery to the fractionation of uranium isotopes, a dilute aqueous acidic uranium solution comprising uranous and uranyl ions, and isotopically constituted of $U^{235}$ and $U^{238}$, is prepared, and the uranous and uranyl ions are maintained in intimate contact until the exchange reaction approaches equilibrium. Thereupon the uranous ions, resultingly enriched slightly in $U^{238}$, are separated from the uranyl ions, resultingly enriched slightly in $U^{235}$, by selective precipitation. Either of the slightly enriched fractions so obtained is further enriched by separately converting it, through involved chemical processing, to an aqueous acidic solution of uranous and uranyl ions which ions are thereupon again maintained intimately contacted until the preferential isotopic exchange approaches equilibrium, whereupon they are separated. To obtain enrichment of a practical magnitude, such single stage exchange equilibrations are successively repeated a multiplicity of times, until the desired degree of enrichment has been obtained. Further details of such uranium enrichment process—which comprises the concepts and inventions of others, and does not, per se, constitute a part of the present invention—are more fully set forth in copending applications, as for example: Application Serial No. 106,803, filed July 26, 1949, in the name of Richard W. Woodward, for Isotopic Exchange Process, and now Patent No. 2,287,587.

Although the aforementioned uranous-uranyl exchange enrichment process is eminently efficacious in affording a single stage increase in $U^{235}:U^{238}$ ratio in the uranyl state by a factor so high as ca. 1.001 times the ratio in the uranous state, and in otherwise affording the great apparatus and operational simplicity of chemical processing as compared with physical separation means, it has not proven to be unqualifiedly satisfactory for the purpose. Undesirably, the amount of involved chemical processing required between exchange stages, when necessarily repeated after each of a multiplicity of the stages, soon assumes enormous proportions. Furthermore, the fact that the efficient enrichment mechanism takes place in a single liquid phase generally limits multi-stage adaptations to inherently-tedious, sequential batch type operation, largely precluding fundamentally simpler and more efficient continuous operation. It has, therefore, remained highly desirable that new, effective means, especially chemical means, be found for more simply and easily fractionating and enriching uranium with respect to individual isotopes, particularly on production scale and in continuous operation.

Accordingly one object of the present invention is to provide a new and improved process for the enrichment of uranium with respect to one or more particular isotopes thereof.

Another object is to provide such a process which is fundamentally chemical in nature, and wherein all operations are conducted in liquid state.

A further object is to provide such a process which is readily adapted to multi-stage operation, but which does not require extensive chemical recovery and reconversion of uranium between separate stages.

Still another object is to provide such a process simply adaptable to the fractionation of uranium isotopes between two discrete liquid phases.

Still a further object is to provide such a process which is of practical fitness and suitability appropriate for large-scale application, and which is adaptable to operation of a truly continuous nature.

Yet another object is to provide such a process adapted to affording substantially complete separation, recovery, and isolation, of individual isotopic species of uranium from other isotopic species thereof.

Additional objects will become apparent hereinafter.

As the basis for the present invention, applicants have discovered that upon equilibrating uranous cations in dissolved aqueous acidic solution with a chelate inner complex of tetravalent uranium, whereupon spontaneous chemical exchange of tetravalent uranium between simple cationic state, and complexed state, takes place, there is a decided preferentiality in the resulting distribution of different uranium isotopes between two states. In particular, applicants have found that $U^{235}$ atoms are preferentially distributed to the uranous cationic phase, while $U^{238}$ atoms preferentially concentrate as the chelate inner complex. Of more especial significance, applicants have discovered that the isotopic preferentiality in such exchange is definite and forceful when the chelate inner complex of tetravalent uranium is water-insoluble, is dissolved in a water-immiscible organic solvent, and is equilibrated with the aqueous tetravalent uranous cations by contacting the aqueous and complex-containing organic phases. Hence, in accordance with the present invention, a new and improved method for enriching uranium with respect to one or more particular isotopes thereof comprises intimately contacting an aqueous solution of tetravalent uranium with a water-immiscible, organic solvent containing dissolved therein a water-insoluble, chelate inner complex of tetravalent uranium, thereby concentrating $U^{235}$ in the aqueous solution and $U^{238}$ in the organic solvent, and thereupon separating the resulting $U^{235}$-enriched aqueous phase from the resulting $U^{238}$-enriched organic phase. Propitiously—and representing a new outstanding exception to the general expectation for an element of such high atomic weight—single-stage isotopic enrichment thus attainable is amply high to make feasible substantially complete isolation of single uranium isotopes by multi-stage operation. For example, a single-stage differentiality of $U^{235}:U^{238}$ ratio between aqueous and organic phases of so high a factor as ca. 1.001, was found consistently achievable. Moreover, in contradistinction to requiring protracted and painstaking precipitation to recover the enriched uranum, the two phases, being immiscible, generally stratify spontaneously and rapidly, thus effectively separating themselves. In addition, in multi-stage engineering application, no chemical recovery and reconversion of uranium between stages is normally needed; ordinarily, simply piping the stratified phases separately to their next successive stages is all that is necessary. Involving merely the contacting of a pair of immiscible liquid phases, the utter simplicity of the apparatus and procedural aspects of the process is readily appreciated. Having such beneficial attributes, the present process clearly affords substantial and practical advantages in uranium isotope enrichment.

Generally speaking, while the compositions of suitable aqueous uranous solutions for effecting the present invention are subject to considerable variation, certain solution conditions are recognized as particularly desirable. Solution conditions favorable to the existence of substantially all aqueous uranium in ionized cationic form are beneficial; in this regard, aqueous solutions of strong inorganic acids have been found especially desirable. Naturally, the anion of the dissolved uranium material, as well as any other extraneous material permitted in the solution, should be of such nature as not to seriously oxidize or reduce the uranous cations, disadvantageously precipitate the uranium, or otherwise deleteriously interfere through their own particular activity with the exchange operation. The chloride anion, being eminently satisfactory in this respect, is preferred for the purpose; accordingly, the particularly preferred aqueous solution is an aqueous hydrochloric acid solution of uranous chloride. It is particularly important that the aqueous solution be maintained moderately acidic, since uranium tends disadvantageously to hydrolyze, polymerize and precipitate as hydroxide and peruranate compound at higher pH's. As is known, pH's below about 2 are generally sufficient to avoid excessive hydrolytic effects in solutions having uranous concentrations as low as 0.1 molar; at progressively higher concentrations, progressively lower pH's are in order. On the other hand, it has been found that adverse decomposition of the chelate inner complexes is mitigated, and the entire exchange operation is generally favored, by higher pH's. Too, from a practical standpoint, to minimize apparatus and plant sizes, the uranium solutions should be as concentrated as is otherwise expedient. Upon balancing these conflicting pH and concentration requirements, the preferred pH range is about 1.5 to 2, with pH's below 1 being desirable where practicable, and with uranous concentrations of the order of 0.1 molar appearing to be the practical optimum.

To best suit the present operation, the chelate inner complex of uranium is preferably substantially insoluble in aqueous acidic solution, but quite soluble in the organic solvent employed. Further, since the complex must undergo contact with the aqueous acidic solution, it is important that it be stable in the presence of such dilute acids; for the same reason the complexant should not be an oxidizing agent for tetravalent uranium or tend to cause such oxidation indirectly. A complex which bonds with the uranium merely moderately is preferred, in order to afford reasonable stability and efficient extraction, and yet to permit vigorous interchange of uranium to take place with the ionic form in aqueous solution. For convenience, a complex of uranium which forms readily and rapidly upon contacting the corresponding complexant with uranous ions, is highly desirable. Preferred, as fulfilling these requirements to an exceptional degree, is the uranous complex of the ammonium salt of phenyl nitroso hydroxylamine (which ammonium salt is more commonly known as "cupferron"), which for convenience hereinafter shall be termed "uranous cupferride." This complex is believed to exist in one or both the tautomeric forms:

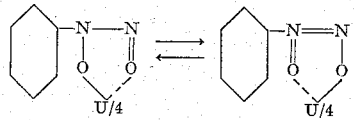

and is water-insoluble but soluble in many organic solvents. More generally, specific examples of chelate inner complexants, representative of broad types which tend largely to meet the foregoing requirements, include: benzohydroxamic acid, benzylhydroxamic acid, β-phenyl-propanhydroxamic acid, benzoylformic acid, dibenzoyl methane, ethyl benzoylpyruvate, ethyl thioglycolic acid, sodium diethyldithiocarbamate, thenoyltrifluoroacetone, trifluoroacetonate, and ammonium thiocyanate. Generally, the uranous complex is readily formed by reacting such complexant with uranous ion in aqueous solution.

For the organic solvent employed, preferred selection is dependently largely on the characteristics of the particular uranous complexant employed, substantial immiscibility with water, and propensity toward rapid and complete stratification from acidic aqueous solution. Among organic solvents, the relative superiority as a solvent tends to vary widely with the specific complexes employed. For the particularly preferred uranous cupferride complex, chloroform has proven to be a particularly efficacious solvent. Typical of other types of organic solvents in which the cupferride complex exhibits notable solubility and stability are ketones, such as methyl isobutyl ketone, alcohols, such as n-butyl alcohol, and esters, such as butyl acetate. Representative, along with chloroform generally, of other suitable organic solvents, aldehydes (e. g. benzaldehyde), esters (e. g. ethyl benzoate), alcohols and ketones are favorable in the cases of hydroxamic acid complexes; esters are notably favorable in the case of thenoyltrifluoroacetone; and alcohols (e. g. butyl alcohol) are favorable to thiocyanate complexes.

In operation, the isotopic exchange operation of the present invention, is readily effected by merely contacting intimately the aqueous uranous solution with the immiscible organic solvent having dissolved therein the uranous chelate inner complex, desirably with mild agitation; then permitting stratification, and thereupon separately withdrawing the stratified aqueous, and organic, phases. Preferably, about a 1:1 volumetric ratio of organic to aqueous phases should be used, with approximately equal amounts of uranium being present in the complexed organic, and aqueous, phases, although widely divergent ratios and uranium contents may also be used. While durations of contact of any length, however small, have some beneficial isotopic enrichment effect, intimate contacting is preferably maintained until the exchange equilibrium is reasonably approached. In the case of the uranous-cupferride-chloroform combination, contacting of the order of 5 minutes or so has been found entirely adequate; however, in the case of other complexants, especially those that bind uranium rather strongly, longer contact periods appear appropriate. An alternative procedure, particularly rapid and effective in instances where all of the uranium is initially present in aqueous solution in dissolved uranous cationic state, comprises adding the uranous complexant, e. g. cupferron, directly to the aqueous solution, and forthwith contacting the complex-containing aqueous solution with the organic solvent; the appropriate amount of complexant is merely enough to complex a portion, preferably about half, of the uranium in the aqueous solution. The resultingly complexed portion of the uranium cations present is thereupon effectively extracted into the organic phase, with the essential isotopic preferentiality obtaining. Similarly, where all the uranium is initially in the aqueous phase, introducing the complexant simultaneously with, or dissolved in, the organic solvent is likewise effective. Following contacting and subsequent stratification of phases, separate withdrawal of each phase is conveniently effected by conventional means, as draining, syphoning, or the like. Thereafter recovery of $U^{238}$-enriched uranium from the complexed state in the separated organic phase is readily accomplished by scrubbing with an aqueous solution fairly concentrated in a strong mineral acid which dissolves uranyl ions, containing an effective oxidant for oxidizing tetravalent uranium to uranyl state. The acid tends to decompose the uranous complex, whereupon the oxidant converts the tetravalent uranium to hexavalent state, which is then stripped from the organic phase as uranyl ions. For example, one normal nitric acid has proven eminently satisfactory for the purpose.

In practice, it has been found that, generally speaking, the uranous complex tends slowly to undergo decomposition when subjected to contact with acidic aqueous solution. While such decomposition normally does not proceed at a prohibitive rate, it has a general detractive effect upon the efficiency of the exchange enrichment, progressively increasing with contact time. Accordingly, for maximum process effectiveness it is advantageous to mitigate such decomposition as far as practicable. This is especially desirable in a case of certain of the complexes, as typified by uranous cupferride, wherein the decomposition not only represents a loss of the complexant itself, but the decomposition products of the cupferride radical tend adversely to oxidize tetravalent uranium to the hexavalent oxidation state. However, it has been found that such decomposition may be minimized by maintaining the liquids cooled to a temperature close to the freezing point of the aqueous solution. Thus, while the operation may ordinarily be effected conveniently at room temperature, some enhancement in efficiency is usually attainable by maintaining the temperature within the range of about 5° to 10° C. In further interest of avoiding serious oxidation of the uranium, it appears highly advisable to avoid exposure of the uranium solution to air, as far as practicable. Occasionally, in the cases of some complexant-solvent combinations, in contact with which the tendency of the tetravalent uranium in aqueous solution to oxidize is unusually pronounced, it is profitable to include a reductant in the aqueous solution, to reduce any oxidized uranium back to the tetravalent state, and/or to suffer oxidation in preference to tetravalent uranium. For example, inclusion of sodium formaldehyde sulfoxalate ($NaSO_2.CH_2OH.2H_2O$), to about 0.1 molar, in the aqueous phase has proved to be notably effective in mitigating oxidation of $U^{+4}$ upon contact with uranous-cupferride-chloroform, although a partial reduction in the extractability of the aqueous uranium into chloroform-cupferride simultaneously obtained.

In production application, where isotopic enrichment of the original uranium greater than that afforded by a single application of applicants' exchange-enrichment operation is normally desired, a plurality of the operations, as separate "stages," may be applied in succession. For example, for multi-stage enrichment with respect to uranium-235, the uranium in the separated aqueous phase of each preceding stage may be used as the source of uranium for both the organic and aqueous phases in the next succeeding enrichment stage. Likewise, for enrichment with respect to uranium-238, a succession of stages may be applied wherein the separated uranium in the separated organic phase from each preceding stage be used as the source of uranium for both the organic and aqueous phases of the next succeeding $U^{238}$-enrichment stage. Although uranium is further enriched in each stage, in this manner, the total amount of uranium persisting through the succession is approximately halved at each stage, such that the amount of enriched uranium finally afforded is many times smaller than that provided at the start.

However, that practical disadvantage is simply, and of course preferably, avoided by employing a batch countercurrent contacting procedure in the manner customary in multi-stage batch liquid-liquid extraction. In the latter arrangement, the complexed uranium bearing organic phase is passed from stage to stage along a succession in one direction, while the aqueous uranous solution is passed from stage to stage through the succession in the opposite direction; in each stage, the separated aqueous phase from the next preceding stage is intimately contacted with the separated organic phase from the next succeeding stage, and after settling, the resulting aqueous phase is passed to the next succeeding stage while the resulting organic phase is passed to the next preceding stage. At the extremities of the succession: the aqueous stream upon reaching one end is completely complexed and extracted into organic solvent, whereupon it is routed back in the opposite direction through the succession; the complexed-uranium-bearing organic stream, upon reaching the other end, is stripped of complexed uranium, and the stripped uranium is dissolved to form an aqueous, acidic uranous solution, which thereupon is routed back through the succession in the opposite direction. The initial uranium feed is introduced at intermediate stage in the succession, while product $U^{235}$-enriched solution is tapped from the end of the succession toward which the aqueous phase proceeds, and while $U^{238}$-enriched uranium is similarly recovered from the other end. Such operation may be made completely continuous by constituting each stage of a mixing tank followed by a settling tank, as is conventional in continuous countercurrent extraction. Thus, at each stage, streams of incoming aqueous and organic phases are continuously introduced to a mixing tank provided with a mechanical agitator, wherein they are thoroughly contacted. The mixed phases then continuously flow into the settling tank, where, in the absence of agitation, the two phases continuously form into stratified layers, each of which is then continuously passed in separate directions from the stage.

An even simpler means for conducting such countercurrent contacting to achieve fully continuous multi-stage enrichment comprises passing the aqueous and organic streams countercurrent to one another in a vertical packed column, with refluxing of streams at each end, in a manner also conventional in the continuous liquid-liquid extraction art. For example, the aqueous uranous solution may be passed upward through a 30 foot column, 1 cm. in diameter, packed with glass helices, in continuous contact with a downward-flowing organic stream bearing the uranous complex. The initial feed, comprising a mixture of aqueous, and complexed-organic, uranous phases is introduced intermediate the ends of the column, while $U^{235}$-enriched product is slowly tapped from the top and $U^{238}$-enriched product is slowly tapped from the bottom. In such column operation, optimum contacting appears to be achieved with the organic phase continuous, and with the consequently-discontinuous aqueous phase wetting the packing. Throughout such multi-stage adaptations, since progressively greater enrichment is effected at each stage, practically any desired degree of isotopic enrichment may be attained by merely providing a sufficient number of stages.

Further illustration of the quantitative aspects and preferred reagents and conditions of the present method is provided in the following specific examples. In each instance, a succession of 8 or 9 stages of the exchange-enrichment procedure was effected, in order to achieve enrichments well beyond the probable analytical error in assaying the isotopic constitution of the resulting fractions. Analyses were made after each stage, however, to indicate the single stage enrichment afforded. The gross, manifold variation in quantities of liquids in proceeding through the succession, made expedient the use of different-sized contacting vessels for almost every succeeding stage. Instead of specially designing each contacting vessel to avoid excessive exposure of the liquids to air, or to permit immediate transfer of liquids from stage to stage in order to avoid prolonged standing of the separated phases, it was found experimentally more convenient to simply incur whatever uranium oxidation and complex decomposition would result from these adverse conditions, but assuredly overcome them by subsequent reduction of the uranium to $U^{+4}$ and re-constitution of the uranous complex immediately prior to proceeding with each successive stage. While an otherwise-innocuous reductant could have been employed for the first purpose, it was chosen to avoid the confusion that the presence of such extraneous agent in the system might impart to positive demonstration of the exchange-enrichment; instead, after each stage the uranium was isolated from solution and reformed into uranous chloride solution containing no other extraneous ions. This was done by means of precipitation of the uranium as hydroxide, then as peroxide, conversion to oxide, re-chlorination, and dissolution in aqueous acidic solution. It is particularly to be pointed out, though, that such precipitation-chlorination procedure need not necessarily be employed between stages; ordinarily, simple contacting of the organic and aqueous solutions, followed by stratification and separation of the resulting aqueous and organic phases, is all that is normally needed in practice. Examples 1 and 2, following, demonstrate enrichment with respect to $U^{235}$, and $U^{238}$, respectively, under the particularly preferred conditions of employing cupferron, chloroform, aqueous uranous chloride, hydrochloric acid, and temperatures maintained near the freezing point. Example 3 demonstrates that the more convenient operation at room temperature is only slightly less efficacious.

EXAMPLE 1

A large quantity of freshly chlorinated uranium tetrachloride (uranium of natural isotopic constitution) was dissolved in one normal hydrochloric acid to give a 3% uranium solution. The aqueous solution was then cooled to, and maintained at, a low temperature as indicated below. To the cooled aqueous solution, in a conventional separatory funnel, cupferron was then added in an amount of approximately 2.5 moles cupferron per mole of uranium—sufficient to cause extraction of about 50% of the $U^{+4}$ content into a volume of chloroform equal to that of the aqueous solution—and a volume of chloroform equal to that of the aqueous solution was forthwith introduced. The resulting two-phase system was thoroughly agitated for 15 minutes, the phases were then permitted to stratify sharply, and the heavier organic phase was segregated from the aqueous by draining. The separated organic phase was discarded. To the separated aqueous phase a stoichiometric excess of $NH_4OH$ was added to precipitate the uranium as uranous hydroxide. The hydroxide precipitate was separated, dissolved in dilute aqueous nitric acid with pH adjusted to ca. 2. To this solution, hydrogen peroxide was added to precipitate $UO_4 \cdot 2H_2O$, which was separated, heated to 350° C. to convert it to $UO_3$, and thereupon reacted with boiling hexachloropropene, under reflux, to convert the $UO_3$ to $UCl_4$. The so obtained $UCl_4$, after removal from the hexachloropropene system is thereupon employed as the starting material for a repetition of the foregoing procedure, constituting a second cycle. Such repetition of the procedure, in each cycle separating and re-converting the uranium from only the aqueous phase, but discarding the organic phase, was continued through nine successive cycles. Throughout the operation, each separated aqueous phase was spectrometrically analyzed for isotopic percentage $U^{235}$. The analytical results obtained, together with the precise quantitative data for each stage, are tabulated in Table I below.

*Table 1*

$U^{235}$ ENRICHMENT RUN (LOW TEMPERATURE)

| Stage | Total Volume | | HCl (conc.) in aqueous (ml.) | Uranium in aqueous (g.) | Cupferron added (g.) | Temperature, ° C. | Assay of Sample (ave.)[1] (per cent $U^{235}$) |
|---|---|---|---|---|---|---|---|
| | Aqueous (ml.) | Chloroform (ml.) | | | | | |
| Start | | | | | | | .7052 |
| 1 | 26,700 | 26,700 | 2,200 | 800 | 1,300 | 10 | |
| 2 | 26,700 | 26,700 | 2,200 | 400 | 488 | 10 | .7052 |
| 3 | 10,000 | 10,000 | 833 | 200 | 244 | 6 | .7070 |
| 4 | 2,900 | 2,900 | 241 | 85 | 114 | 4 | .7077 |
| 5 | 1,367 | 1,367 | 114 | 42 | 47 | 9 | .7082 |
| 6 | 673 | 673 | 56 | 21.2 | 23 | 9 | .7083 |
| 7 | 337 | 337 | 28 | 10 | 11.6 | 9 | |
| 8 | 169 | 169 | 14 | 5 | 5.8 | 9 | .7064 |
| 9 | 85 | 85 | 7 | 2.5 | 3.0 | 9 | .7081 |

[1] Estimated precision: ±0.0008% $U^{235}$.

EXAMPLE 2

In a manner analogous to that employed in Example 1, an eight-stage $U^{238}$-enrichment (i. e. $U^{235}$-depletion) run was effected. As in Example 1, in each stage, freshly-chlorinated $UCl_4$ was the starting material, which was dissolved in one normal hydrochloric acid, cooled, whereupon cupferron was added, and the solution was agitated with an equal volume of chloroform for 15 minutes. However, in each stage it was only the organic phase that was recovered, with the aqueous phase being discarded. In each case, the uranium content was stripped from the separated organic phase by agitation for 1 hour with one normal nitric acid; thereupon, the pH of the resulting uranyl solution was raised to 2 by addition of $NH_4OH$, hydrogen peroxide was added to precipitate $UO_4 \cdot 2H_2O$, which was then heated to 350° C. for conversion to $UO_3$, which in turn was reacted with boiling hexachloropropene, under reflux, for conversion of the $UO_3$ to freshly-chlorinated $UCl_4$ for the next stage. Spectrometric analyses for isotopic uranium constitution were made after each individual stage; for greater precision, the results are recorded again in terms of percentage $U^{235}$. Analytical results, together with the precise quantitative data for each stage, are tabulated in Table II below.

Table II
U²³⁵ DEPLETION RUN (LOW TEMPERATURE)

| Stage | Total Volume | | HCl (conc.) in aqueous (ml.) | Uranium in aqueous (g.) | Cupferron added (g.) | Temperature, °C. | Assay of Sample (ave.) (percent U²³⁵) |
|---|---|---|---|---|---|---|---|
| | Aqueous (ml.) | Chloroform (ml.) | | | | | |
| Start | | | | | | 5–10 | |
| 1 | 26,700 | 26,700 | 2,200 | 400 | | 5–10 | .7067 |
| 2 | 6,600 | 6,600 | 550 | 198 | 258 | 5–10 | |
| 3 | 1,600 | 1,600 | 133 | 47.8 | 94 | 5–10 | .7061 |
| 4 | 1,083 | 1,083 | 90 | 32.5 | 60 | 5–10 | .7070 |
| 5 | 593 | 593 | 49 | 17.8 | 33 | 5–10 | |
| 6 | 393 | 393 | 33 | 11.3 | 20 | 5–10 | |
| 7 | 201 | 201 | 17 | 6.0 | 10 | 5–10 | |
| 8 | 103 | 103 | 9 | 3.1 | 5 | 5–10 | { .7042 / .7042 |

EXAMPLE 3

The procedure was repeated, with the exception that the exchange, in each stage, was effected merely at room temperature. Analytical results and quantitative data are presented in Table III below.

Table III
RUN (ROOM TEMPERATURE)

| Stage | Total Volume | | HCl (conc.) in aqueous (ml.) | Uranium in aqueous (g.) | Cupferron added (g.) | Temperature, °C. | Assay of Sample (ave.) (percent U²³⁵) |
|---|---|---|---|---|---|---|---|
| | Aqueous (ml.) | Chloroform (ml.) | | | | | |
| Start | | | | | | | −.7052 |
| 1 | 26,700 | 26,700 | 2,200 | 800 | 1,300 | 28 | .7052 |
| 2 | 10,900 | 10,900 | 833 | 328 | 535 | 28 | .7054 |
| 3 | 6,100 | 6,100 | 508 | 183 | 298 | 28 | .7055 |
| 4 | 3,200 | 3,200 | 266 | 96.5 | 156.7 | 28 | |
| 5 | 1,580 | 1,580 | 132 | 47.4 | 77.6 | 28 | .7030 |
| 6 | 786 | 786 | 66 | 23.6 | 38.8 | 28 | |
| 7 | 397 | 397 | 33.1 | 11.9 | 19.4 | 28 | |
| 8 | 203 | 203 | 17.0 | 6.1 | 9.7 | 28 | |
| 9 | 103 | 103 | 8.6 | 3.1 | 5.0 | 28 | { .7045 / .7044 |

The definite enrichment afforded by the present exchange method is clearly evidenced in the foregoing results. From these results, it is calculable that in each stage, the $U^{235}:U^{238}$ ratio in the separated aqueous phase obtained was approximately 1.001 times that in the separated organic phase obtained, in the case of Examples 1 and 2, and only slightly smaller in the case of Example 3. It is important again to note that the precipitation recovery of uranium and re-chlorination between phases were merely employed for experimental convenience, and clarity of demonstration; while they could, of course, be used in practice, they ordinarily are dispensed with.

EXAMPLE IV

In demonstration of such dispensability, another multi-stage run, was conducted, with the exception that instead of any precipitation and re-chlorination between stages, a little zinc was added to the separated aqueous 1 N HCl solution to insure reduction of any uranium oxidized above the tetravalent state by prolonged exposure to air. Thereupon, in each case, the next stage was applied simply by adding the cupferron directly to the zinc-reduced aqueous phase and contacting with the chloroform; on the average, the $U^{235}:U^{238}$ ratio in the separated aqueous phase from each stage was again of the high order of ca. 1.001 times that in the separated organic phase.

In production operations, under conditions avoiding unnecessary exposure to air and affording rapid progress from one stage to the next, uranium oxidation is normally innocuous over many successive stages, so that even the simple zinc-addition measure may not be needed.

Although this invention has been described with particular emphasis upon its very important application to the enrichment of natural uranium with respect to $U^{235}$ and/or $U^{238}$, it is inherently of much wider applicability. The present method is also well adapted to the enrichment of uranium initially in isotopic proportion other than that found in nature. For instance, it is eminently suited for application to the final enrichment of $U^{235}$, after its initial enrichment and isolation from the bulk of other isotopes by means of other conventional production procedures. Also, a particularly promising application is in the recovery and reconversion of uranium depleted in $U^{235}$ from the waste products of nuclear reactors. Upon use of natural uranium for fuel in nuclear reactors, the isotopic proportion of $U^{235}$ is generally reduced below that found in nature. In partial or complete reconversion of this $U^{235}$-depleted uranium back to uranium of natural isotopic proportion, the present operation has direct application. Furthermore, it may also be applied to the concentration of other uranium isotopes, as light $U^{234}$ or $U^{233}$, which should concentrate in the aqueous phase, while heavier isotopes, as $U^{238}$, concentrate in the organic phase. In addition, the method may also be applied to other elements, especially in the transuranic realm, which form water-insoluble chelate inner complexes of high-positive-valent cations, soluble in water-immiscible organic solvents, and which are constituted of different isotopes which concentrate preferentially in the organic and aqueous phases. Various additional applications of the hereinbefore-disclosed methods will become apparent to those skilled in the art. It is therefore to be understood that all matters contained in the above description and examples are illustrative only and do not limit the scope of the present invention.

What is claimed is:

1. A new and improved process for enriching, with respect to at least one isotope, uranium initially isotopically comprising uranium-235 and uranium-238, which comprises intimately contacting an aqueous solution of said uranium in dissolved tetravalent cationic state, with a water-immiscible organic solvent containing dissolved therein a water-insoluble chelate inner complex of said uranium in tetravalent state derived from a corresponding chelate inner complexant selected from the group consisting of cupferron, benzohydroxamic acid, benzylhydroxamic acid, β-phenylpropanhydroxamic acid, benzoylformic acid, dibenzoyl methane, ethyl benzoylpyruvate, ethyl thioglycolic acid, sodium diethyldithiocarbamate, thenoyltrifluoracetone, trifluoroacetonate, and ammonium thiocyanate, while restricting the total cumulative amount of chelate inner complexant incorporated in the system to a substantially sub-stoichiometric quantity with respect to the total quantity of uranium present in the system, thereby concentrating uranium-235 in the aqueous solution and uranium-238 as chelate inner complex in the organic solvent, and thereupon separating the resulting aqueous phase from the resulting organic phase.

2. A new and improved process for enriching, with respect to at least one istotope, uranium initially isotopically comprising uranium-235 and uranium-238, which comprises intimately contacting an aqueous acidic solution of said uranium in dissolved tetravalent cationic state, with a water-immiscible organic solvent containing dissolved therein a water-insoluble chelate inner complex of said uranium in tetravalent state derived from a corresponding chelate inner complexant selected from the group consisting of cupferron, benzohydroxamic acid, benzylhydroxamic acid, β-phenylpropanhydroxamic acid, benzoylformic acid, dibenzoyl methane, ethyl benzoylpyruvate, ethyl thioglycolic acid, sodium diethyldithiocarbamate, thenoyltrifluoroacetone, trifluoroacetonate, and ammonium thiocyanate, while restricting the total cumulative amount of chelate inner complexant incorporated in the system to a substantially sub-stoichiometric quantity with respect to the total quantity of uranium present in the system, thereby concentrating uranium-235 in the aqueous solution and uranium-238 as chelate inner complex in the organic solvent, and thereupon separating the resulting aqueous phase from the resulting organic phase.

3. A new and improved process for enriching, with respect to at least one isotope, uranium initially isotopically comprising uranium-235 and uranium-238, which comprises initimately contacting an aqueous acidic solution of said uranium in dissolved tetravalent cationic state, with chloroform containing dissolved therein a cupferride complex of said uranium in tetravalent state derived from cupferron, while restricting the total cumulative amount of chelate inner complexant incorporated in the system to a substantially sub-stoichiometric quantity with respect to the total quantity of uranium present in the system, thereby concentrating uranium-235 in the aqueous solution and uranium-238 as uranous cupferride complex in the chloroform, and thereupon separating the resulting aqueous phase from the resulting chloroform phase.

4. The process of claim 3 wherein said aqueous solution of uranium is an aqueous strong inorganic acid solution of said uranium.

5. The process of claim 3 wherein said aqueous solution of uranium is an aqueous hydrochloric acid solution, of pH with the approximate range of 1.5 to 2, of uranous chloride in concentration of substantially 0.1 molar.

6. The process of claim 3 wherein the ratio of the volume of said aqueous solution to that of said chloroform is substantially 1:1.

7. The process of claim 3 wherein the ratio of the volume of said aqueous solution to that of said chloroform is substantially 1:1, wherein the amount of uranium dissolved in said aqueous solution and the amount of uranium existing as cupferride complex in said chloroform are approximately equal, and wherein the duration of said intimate contacting is of the order of 5 minutes.

8. The process of claim 3 wherein the temperature of the system is maintained in the approximate range 5° to 10° C. throughout said intimate contacting.

9. A new and improved process for enriching, with respect to at least one isotope, uranium initially isotopically comprising uranium-235 and uranium-238, which comprises intimately contacting an aqueous acidic solution of said uranium in dissolved tetravalent cationic state, having also dissolved therein a sodium formaldehyde sulfoxalate to inhibit oxidation of said uranium dissolved therein beyond said tetravalent cationic state, with chloroform containing dissolved therein a cupferride complex of said uranium in tetravalent state derived from cupferron, while restricting the total cumulative amount of chelate inner complexant incorporated in the system to a substantially sub-stoichiometric quantity with respect to the total quantity of uranium present in the system, thereby concentrating uranium-235 in the aqueous solution and uranium-238 as uranous cupferride complex in the chloroform, and thereupon separating the resulting aqueous phase from the resulting organic phase.

10. The process of claim 9 wherein said sodium formaldehyde sulfoxalate is present in concentration of the order of 0.1 molar.

11. A new and improved process for enriching, with respect to at least one isotope, uranium initially isotopically comprising uranium-235 and uranium-238, which comprises introducing, into an aqueous acidic solution of said uranium in dissolved tetravalent cationic state, cupferron in an amount substantially stoichiometrically insufficient to form uranous cupferride complex with all of said uranium present, thereby forming uranous cupferride complex with a portion of said uranium present, thereupon intimately contacting the resulting uranous-cupferride-containing aqueous uranium solution with chloroform, thereby extracting uranous cupferride complex into the chloroform, thereby concomitantly concentrating uranium-235 in the aqueous solution and uranium-238 as uranous cupferride in the chloroform, and thereupon separating the resulting aqueous phase from the resulting chloroform phase.

12. A new and improved process for enriching, with respect to at least one isotope, uranium initially isotopically comprising uranium-235 and uranium-238, which comprises intimately contacting an aqueous solution of said uranium in dissolved tetrovalent cationic state, with chloroform containing dissolved therein cupferron in amount substantially stoichiometrically insufficient to form uranous cupferride complex with all of said uranium present, thereby complexing a portion of said uranium as uranous cupferride complex and extracting same, into the chloroform, thereby concomitantly concentrating uranium-235 in the aqueous solution and uranium-238 as uranous cupferride complex in the chloroform, and thereupon separating the resulting aqueous phase from the resulting chloroform phase.

13. The process of claim 3 wherein said separated resulting chloroform phase is subsequently stripped of uranium values contained therein by contacting with aqueous nitric acid.

14. A new and improved process for enriching, with respect to uranium-235, uranium initially isotopically comprising uranium-235 and uranium-238, which comprises applying a succession of processing stages, starting with an aqueous acidic solution of said uranium in dissolved tetravalent cationic state, with each said stage comprising: introducing to the aqueous acidic solution of uranium in dissolved tetravalent cationic state, cupferron in amount substantially stoichiometrically insufficient to form uranous cupferride complex with all of the uranium present, thereby forming uranous cupferride complex with a portion of uranium present, thereupon intimately contacting the uranous-cupferride-containing aqueous uranium solution with chloroform, thereby extracting said uranous cupferride into the chloroform, and thereby concomitantly concentrating uranium-235 in the aqueous solution and uranium-238 as uranous cupferride complex in the chloroform, and thereupon separating the resulting aqueous phase, from the chloroform phase, to serve as the starting aqueous acidic solution of said uranium in dissolved tetravalent cationic state for the next processing stage in the succession; thereby, in each stage, progressively further enriching the aqueous solution in uranium-235, and at the end of the succession recovering the final resulting aqueous phase.

15. A new and improved process for enriching, with respect to uranium-238, uranium initially isotopically comprising uranium-235 and uranium-238, which comprises applying a succession of processing stages, starting with an aqueous acidic solution of said uranium in dissolved tetravalent cationic state, with each said stage comprising: introducing, into the aqueous acidic solution of uranium in dissolved tetravalent cationic state, cupferron, in amount substantially stoichiometrically insufficient to form uranous cupferride complex with all of the uranium present, thereby forming uranous cupferride complex with a portion of the uranium present, thereupon intimately contacting the uranous-cupferride-containing aqueous solution with chloroform, thereby extracting said uranous cupferride into the chloroform, thereby concomitantly concentrating uranium-238 as uranous cupferride complex in the chloroform, thereupon separating the resulting chloroform phase from the resulting aqueous phase, and forming, from the uranium content of the so-separated chloroform phase, an aqueous acidic solution of uranium in dissolved tetravalent cationic state, to serve as the starting aqueous uranium solution for the next stage in the succession; thereby, in each stage, enriching the chloroform phase with respect to uranium-238, and, at the end of the succession, recovering the final resulting chloroform phase.

16. A new and improved process for isotopically depleting, with respect to uranium-235, uranium initially isotopically comprising uranium-235 and uranium-238, which comprises applying a succession of processing stages, starting with an aqueous acidic solution of said uranium in dissolved tetravalent cationic state, with each said stage comprising: introducing, into the aqueous acidic solution of uranium in dissolved tetravalent cationic state, cupferron, in amount substantially stoichiometrically insufficient to form uranous cupferride complex with all of the uranium present, thereby forming uranous cupferride complex with a portion of the uranium present, thereupon intimately contacting the uranous-cupferride-containing aqueous solution with chloroform, thereby extracting said uranous cupferride into the chloroform, thereby concomitantly depleting, with respect to uranium-235, the uranous cupferride complex in the chloroform, thereupon separating the resulting uranium-235-depleted chloroform phase from the resulting aqueous phase; thereby obtaining, in each stage, a progressively further uranium-235-depleted chloroform phase, and, at the end of the succession, recovering the final resulting uranium-235-depleted chloroform phase.

17. A new and improved process for enriching, with respect to uranium-235, uranium initially isotopically comprising uranium-235 and uranium-238, which comprises applying a succession of processing stages, starting with an aqueous acidic solution of said uranium in dissolved tetravalent cationic state, with each said stage comprising: introducing to the aqueous acidic solution of uranium in dissolved tetravalent cationic state, cupferron in amount substantially stoichiometrically insufficient to form uranous cupferride complex with all of the uranium present, thereby forming uranous cupferride complex with a portion of uranium present, thereupon intimately contacting the uranous-cupferride-containing aqueous uranium solution with chloroform, thereby extracting said uranous cupferride into the chloroform, and thereby concomitantly concentrating uranium-235 in the aqueous solution and uranium-238 as uranous cupferride complex in the chloroform, thereupon separating the resulting aqueous phase from the chloroform phase, adding to the separated aqueous phase a stoichiometric excess of ammonium hydroxide to precipitate the uranium therein as uranous hydroxide, separating and dissolving the resulting uranous hydroxide precipitate in dilute aqueous nitric acid of pH of substantially 2, adding hydrogen peroxide to the resulting aqueous nitric acid solution to precipitate uranium peroxide, separating and heating the precipitated uranium peroxide to convert it to uranium trioxide, and thereupon contacting the formed uranium trioxide with boiling hexachloropropene, under reflux, to covert the trioxide to uranium tetrachloride, removing the formed uranium tetrachloride from the hexachloropropene system, and dissolving in aqueous hydrochloric acid, to thereby form the starting aqueous acidic solution of said uranium in dissolved tetravalent cationic state for the next processing stage in the succession; thereby, in each stage, progressively further enriching the aqueous solution in uranium-235, and at the end of the succession recovering the final resulting aqueous phase.

18. A new and improved process for enriching, with respect to uranium-238, uranium initially isotopically comprising uranium-235 and uranium-238, which comprises applying a succession of processing stages, starting with an aqueous acidic solution of said uranium in dissolved tetravalent cationic state, with each said stage comprising: introducing, into the aqueous acidic solution of uranium in dissolved tetravalent cationic state, cupferron, in amount substantially stoichiometrically insufficient to form uranous cupferride complex with all of the uranium present, thereby forming uranous cupferride complex with a portion of the uranium present, thereupon intimately contacting the uranous-cupferride-containing aqueous solution with chloroform, thereby extracting said uranous cupferride into the chloroform, thereby concomitantly concentrating uranium-238 as uranous cupferride complex in the chloroform, thereupon separating the resulting chloroform phase from the resulting aqueous phase, thereafter contacting the separated chloroform phase with aqueous nitric acid to strip the uranium content therefrom, thereupon adjusting the pH of the resulting uranium-containing nitric acid solution to pH 2 by addition of ammonium hydroxide, then adding hydrogen peroxide to precipitate uranium peroxide, separating and heating the precipitated uranium peroxide to convert it to uranium trioxide, thereupon separating and contacting the converted uranium trioxide with boiling hexachloropropene, under reflux, to convert the trioxide to uranium tetrachloride, then removing the formed uranium tetrachloride from the hexachloropropene system, and dissolving the tetrachloride in aqueous hydrochloric acid, thereby providing a starting aqueous uranium solution for the next stage in the succession; thereby, in each stage, enriching the chloroform phase with respect to uranium-238, and, at the end of the succession, recovering the final resulting chloroform phase.

19. A new and improved process for enriching, with respect to at least one isotope, uranium initially isotopically comprising uranium-235 and uranium-238, which comprises forming, with a fraction of the initial quantity of said uranium, an aqueous solution of said uranium in dissolved tetravalent cationic state, forming with the remainder of said quantity of said uranium a water-insoluble chelate inner complex of said uranium in tetravalent state derived from a corresponding chelate inner complexant selected from the group consisting of cupferron, bezohydroxamic acid, benzylhydroxamic acid, β-phenylpropanhydroxamic acid, benzoylformic acid, dibenzoyl methane, ethyl benzoylpyruvate, ethyl thioglycolic acid, sodium diethyldithiocarbamate, thenoyltrifluoroacetone, trifluoroacetonate, and ammonium thiocyanate, and thereupon intimately contacting altogether said aqueous solution, said chelate inner complex, and a water-immiscible organic solvent for said chelate inner complex, while restricting the total cumulative amount of chelate inner complexant incorporated in the system to a substantially sub-stoichiometric quantity with respect to the total quantity of uranium present in the system, thereby concentrating uranium-235 in the aqueous solution and uranium-238 as chelate inner complex dissolved in said organic solvent, and thereupon separating the resulting aqueous phase from the resulting organic phase.

20. The process of claim 19 wherein said complexant is cupferron.

References Cited in the file of this patent

UNITED STATES PATENTS 2,048,820   Schmid _____ July 28, 1936

OTHER REFERENCES

Gaynor: Encyclopedia of Atomic Energy, pp. 194–195, Philosophical Library, 11 S. E. 40th Street, N. Y. C.

Irving et al.: Journal of the Chemical Society, London, 1949, pp. 1841–1847.

Duffield et al.: Journal of the American Chemical Society, vol. 68, pp. 557–561 (1946).

Furman et al.: Analytical Chemistry, vol. 21, pp. 1325–1330 (1949).